No. 730,196. Patented June 2, 1903.

UNITED STATES PATENT OFFICE.

JOKICHI TAKAMINE, OF NEW YORK, N. Y.

PROCESS OF ISOLATING THE ACTIVE PRINCIPLE OF THE SUPRARENAL GLANDS.

SPECIFICATION forming part of Letters Patent No. 730,196, dated June 2, 1903.

Original application filed November 5, 1900, Serial No. 35,546. Divided and this application filed November 26, 1900. Serial No. 37,729. (No specimens.)

*To all whom it may concern:*

Be it known that I, JOKICHI TAKAMINE, a subject of the Emperor of Japan, residing in the city of New York, county and State of New York, have invented certain new and useful Improvements in Processes of Obtaining a New and Useful Product of the Suprarenal Glands; and I do hereby declare the following to be a full, clear, and exact description of the invention, such as will enable others skilled in the art to which it appertains to make and use the same.

This invention relates to improvements in processes of obtaining a new and useful product possessing in a stable and concentrated form the blood-pressure-raising, hemostatic, and astringent properties and characteristics of the suprarenal glands.

In my application, Serial No. 35,546, filed November 5, 1900, I have disclosed a process of preparing this substance in a pure state, with several modifications of such process, and the present application relates to one of such modifications.

The process is carried out as follows: In carrying out my invention the clean suprarenal capsules from animals—such as cattle, sheep, &c.—are disintegrated by suitable means. The mass is then mixed with about the same weight of water or other solvent and steeped at a temperature of about 60° to 75° centigrade for the period of about five to ten hours in a suitable vessel to obtain a fluid extract of the glands, preferably avoiding contact with atmospheric air, which can be to a great extent accomplished by a film of fat floating on top of the liquid, or may be done by passing a slow current of hydrogen or carbon dioxid into the top part of the vessel. The object of this is to prevent the oxidation of the extract. At the latter part of the steeping the temperature of the mixture may be raised from 85° to 100° centigrade. The mass is now strained, and the residue is pressed to squeeze out as much liquid as possible. The residue thus pressed out is steeped again with the least amount of water to cover the mass for several hours at the same temperature as above. The two extracts thus obtained are mixed, and the mixture is cooled rapidly and the solidified fat removed. The liquid is now evaporated at a low temperature, preferably in a vacuum-pan, admitting, if necessary, a small quantity of hydrogen or carbon dioxid to replace air and to prevent oxidation. The liquid is evaporated until it becomes one-fifth to one-seventh of the original volume. To this concentrated solution two to three times its own volume of alcohol is added, so that the mixture will contain about sixty per cent. of alcohol by volume. This addition of alcohol will precipitate non-active bodies, such as albuminoids, phosphates, and other mineral salts. It is then filtered and the filtrate distilled under vacuum to separate the alcohol. The filtrate is thus concentrated to such a degree that its specific gravity becomes 1.95 to 1.15, and then caustic ammonia (ammonium hydrate) is added until the solution acquires a strong smell of ammonia. The solution is then allowed to remain in a cool place for twelve to twenty-four hours, when formation of the crystals will be observed. The crystalline substance so produced is filtered and washed with water and alcohol and dried and constitutes an active alkaloid principle of the suprarenal gland and is the product sought.

In order to further purify the product, it may be dissolved in the least possible amount of weak acid, such as acetic acid or hydrochloric or other acids. The solution is then filtered, if necessary, and caustic ammonia or alkaline carbonates are added, so as to make the solution strongly alkaline. The product will then crystallize out in much purer form than before, being practically free from inorganic matter. This process of recrystallization may be repeated until the substance becomes quite pure, or the crude substance may be dissolved in the least possible amount of weak caustic alkali, filtered, if necessary, and carbon dioxid then passed into the solution, thereby forming a crystalline precipitate of the substance, this recrystallization being repeated, if desired.

During the above-described manipulations oxidation of the substance by the absorption of oxygen from the air must be avoided as far as possible, due precautions being taken for that purpose.

In refining the material by the use of either acid or alkali I prefer, after dissolving it in such acid or alkali, to add strong alcohol in the proportion of from two to ten times its own volume to precipitate the mineral impurities contained therein. The liquid is then filtered, and to the clear filtrate about one-half its own volume of ether is preferably added, this precipitating dark-brown foreign matters, chiefly consisting of coloring-matters, which are then removed by filtration. The filtrate is then neutralized with alkaline carbonates or ammonia or suitable alkaline substances, if acid has been employed, or with an acid reagent, if the solution has been effected with alkali, and the substance is thereby precipitated.

In either method of purification the crystalline precipitate is filtered, washed with water and alcohol, and dried.

The method of purification in which caustic alkali and a neutralizing agent is employed is not specifically claimed herein, as it forms the subject-matter of another divisional application, Serial No. 30,730.

Having thus described my invention, the following is what I claim as new therein and desire to secure by Letters Patent:

1. The process of obtaining a product of the suprarenal glands, which consists in making a fluid extract of said glands, precipitating from said extract the inert albuminoid and mineral matters, removing said precipitate, treating the residue with ammonia to precipitate the said product.

2. The process of obtaining a product of the suprarenal glands which consists in making an aqueous extract of said glands, precipitating from said extract inert albuminoids and mineral matters, removing the precipitate, adding ammonia to the residue to precipitate the said product therefrom.

3. The process of obtaining a product of the suprarenal glands, which consists in concentrating the aqueous extract of the fresh gland, and in adding alcohol to precipitate inert albuminoids and mineral matters, evaporating the alcohol and water so as to further concentrate the liquid, then adding ammonia in sufficient quantity to precipitate the said product in alkaloid form, washing the precipitate with suitable liquid, and drying the same, all substantially as set forth.

4. The process of obtaining a product of the suprarenal glands, which consists in steeping in water the comminuted glands at a suitable temperature for a suitable number of hours; separating the soluble matter by filtration and pressing; evaporating the filtrate to such consistency that the inert albuminoid and mineral salts will precipitate out by addition of a suitable amount of alcohol, adding a suitable amount of alcohol to precipitate the maximum amount of inert albuminoid and mineral matters, evaporating off the alcohol, and further evaporating the liquid to a suitable strength; adding ammonia in sufficient quantity to precipitate the said product in crystalline form, separating the crystalline precipitate, washing with water and alcohol, and drying the product, all substantially as described.

5. The process of obtaining a product of the suprarenal glands, which consists in steeping in water the comminuted glands at a suitable temperature for a suitable number of hours, separating the soluble matter by filtration and pressing, evaporating the filtrate to such consistency that the inert albuminoid and mineral salts will precipitate out by addition of a suitable amount of alcohol, adding a suitable amount of alcohol to precipitate the maximum amount of inert albuminoid and mineral matters, distilling off alcohol, and further evaporating the liquid to a suitable strength, adding ammonia in sufficient quantity to precipitate the said product of the glands in a crystalline form, washing the precipitate with water and alcohol and drying the product, all substantially as described.

6. The process of refining and preparing the product of the suprarenal glands in purer form, which consists in dissolving said product in a suitable acid solvent, adding to said solution strong alcohol to precipitate impurities therefrom, separating the said precipitated impurities, treating the residue with an alkaline reagent to neutralize the solvent and precipitate the product, washing said precipitated active principle with alcohol and water and then drying the same.

7. The process of refining and preparing the product of the suprarenal glands in purer form, which consists in dissolving said product in dilute acetic acid, adding to said solution strong alcohol to precipitate impurities therefrom, separating the said precipitated impurities, treating the residue with an alkaline reagent to neutralize the solvent and precipitate the active principle, washing said precipitated product with alcohol and water and then drying the same.

8. The process of refining and preparing the product of the suprarenal glands in purer form, which consists in dissolving the said product in a non-neutral solvent, adding alcohol to said solution to precipitate mineral impurities, separating said precipitated impurities, adding ether to the residue to precipitate coloring-matters, separating said precipitated coloring-matters, and adding to the residue a neutralizing agent for a solvent to precipitate the said product.

9. The process of refining and preparing the product of the suprarenal glands in purer form, which consists in dissolving said product in an acid solvent, adding alcohol to said solution to precipitate mineral impurities, separating said precipitated impurities, adding ether to the residue to precipitate coloring-matters, separating said precipitated coloring-matters, and adding to the residue a neutralizing agent for a solvent to precipitate the said product.

JOKICHI TAKAMINE.

Witnesses:
  J. GREEN,
  A. P. KNIGHT.